(12) United States Patent
Sahara

(10) Patent No.: US 8,582,683 B2
(45) Date of Patent: Nov. 12, 2013

(54) WIRELESS COMMUNICATION DEVICE AND WIRELESS COMMUNICATION METHOD

(75) Inventor: Toru Sahara, Yokohama (JP)

(73) Assignee: KYOCERA Corporation, Kyoto (JP)

(*) Notice: Subject to any disclaimer, the term of this patent is extended or adjusted under 35 U.S.C. 154(b) by 405 days.

(21) Appl. No.: 12/999,729

(22) PCT Filed: Jun. 24, 2009

(86) PCT No.: PCT/JP2009/061511
§ 371 (c)(1),
(2), (4) Date: Dec. 17, 2010

(87) PCT Pub. No.: WO2009/157481
PCT Pub. Date: Dec. 30, 2009

(65) Prior Publication Data
US 2011/0096823 A1 Apr. 28, 2011

(30) Foreign Application Priority Data
Jun. 25, 2008 (JP) ................ 2008-166559

(51) Int. Cl.
*H04L 27/00* (2006.01)

(52) U.S. Cl.
USPC ........... 375/295; 375/260; 375/346; 375/316; 370/315; 370/329; 370/322; 370/437; 370/443; 455/7; 455/452.1; 455/540; 455/461; 455/154.1; 714/746; 714/751; 714/758; 714/800

(58) Field of Classification Search
USPC ........ 370/200–546; 375/130–377; 455/1–899
See application file for complete search history.

(56) References Cited

U.S. PATENT DOCUMENTS 7,627,050 B2 * 12/2009 Kim et al. ............ 375/267
7,715,866 B2 * 5/2010 Seppinen et al. ......... 455/522

(Continued)

FOREIGN PATENT DOCUMENTS

JP 07-095151 A 4/1995
JP 2003-018647 A 1/2003

(Continued)

OTHER PUBLICATIONS

Association of Radio Industries and Businesses (ARIB), "OFDMA/TDMA TDD Broadband Wireless Access System (Next Generation PHS) ARIB Standard," Dec. 12, 2007, ARIB, Version 1.0, p. 91-92.*

(Continued)

*Primary Examiner* — Daniel Washburn
*Assistant Examiner* — Amneet Singh
(74) *Attorney, Agent, or Firm* — Procopio, Cory, Hargreaves & Savitch LLP

(57) ABSTRACT

To realize prompt and efficient data communication by dynamically changing the optimum MCS and PC. A base station (120) serving as a wireless communication device according to the present invention includes an obtaining unit (220) for obtaining an RSSI and an SINR of a receive signal upon generation of transmission data to be sent to a PHS terminal (110) serving as a wireless communication device to communicate with; a modulation and coding scheme determining unit (224) for determining an MCS, based on the volume of the transmission data; a transmission power determining unit (226) for determining a transmission power, based on the volume of the transmission data, the RSSI, the SINR, and the MCS determined; and a wireless communication unit (214) for sending the transmission data, using the MCS determined and the transmission power determined.

7 Claims, 6 Drawing Sheets

(56) References Cited

U.S. PATENT DOCUMENTS

| | | | |
|---|---|---|---|
| 8,036,179 B2* | 10/2011 | Wu | 370/332 |
| 2005/0130694 A1* | 6/2005 | Medvedev et al. | 455/522 |
| 2005/0201309 A1* | 9/2005 | Kang et al. | 370/310 |
| 2005/0232156 A1* | 10/2005 | Kim et al. | 370/236 |
| 2007/0099648 A1* | 5/2007 | Kim et al. | 455/522 |
| 2007/0206534 A1* | 9/2007 | Kwun et al. | 370/329 |
| 2007/0207810 A1* | 9/2007 | Cho et al. | 455/450 |
| 2007/0263747 A1* | 11/2007 | Matsumoto et al. | 375/296 |
| 2008/0008113 A1* | 1/2008 | Cho et al. | 370/318 |
| 2008/0056181 A1* | 3/2008 | Imamura et al. | 370/329 |
| 2008/0165873 A1* | 7/2008 | Ghosh et al. | 375/261 |
| 2008/0304584 A1* | 12/2008 | Nishio et al. | 375/260 |
| 2009/0003467 A1* | 1/2009 | Chen | 375/260 |
| 2009/0296574 A1* | 12/2009 | Liao et al. | 370/230 |
| 2009/0296649 A1* | 12/2009 | Yagi | 370/330 |
| 2009/0305690 A1* | 12/2009 | Yuda et al. | 455/422.1 |
| 2010/0035646 A1* | 2/2010 | Miao et al. | 455/522 |
| 2010/0278225 A1* | 11/2010 | Chun et al. | 375/224 |

FOREIGN PATENT DOCUMENTS

| | | |
|---|---|---|
| JP | 2005-051326 A | 2/2005 |
| JP | 2006-279855 A | 10/2006 |
| JP | 2007-028568 A | 2/2007 |
| KR | 10-2005-0081528 A | 8/2005 |
| KR | 10-0587417 B1 | 6/2006 |
| WO | 2008/056774 A1 | 5/2008 |

OTHER PUBLICATIONS

International Search Report dated Aug. 18, 2009 issued by the Japanese Patent for International Application No. PCT/JP2009/061511.

Association of Radio Industries and Businesses (ARIB), "OFDMA/TDMA TDD Broadband Wireless Access System (Next Generation PHS) ARIB Standard", ARIB STD-T95, Version 1.0, Dec. 12, 2007.

International Preliminary Report on Patentability dated Feb. 8, 2011 issued by WIPO for International Application No. PCT/JP2009/061511.

Written Opinion issued by ISA for International Application No. PCT/JP2009/061511.

Office Action dated Mar. 19, 2012, issued in counterpart Korean Patent Application No. 10-2010-7028693.

* cited by examiner (a)

| MCS INDICATOR | MODULATION SCHEME | CODING SCHEME (Puncturing Rate) | MODULATION AND CODING EFFICIENCY |
|---|---|---|---|
| 0 | BPSK | 1 | 0.5 |
| 1 | BPSK | 3/4 | 0.67 |
| 2 | QPSK | 1 | 1 |
| 3 | QPSK | 4/6 | 1.5 |
| 4 | Reserved | – | – |
| 5 | 16QAM | 1 | 2 |
| 6 | 16QAM | 4/6 | 3 |
| 7 | 64QAM | 3/4 | 4 |
| 8 | 64QAM | 6/10 | 5 |
| 9 | 256QAM | 4/6 | 6 |
| 10 | 256QAM | 8/14 | 7 |

WIRELESS COMMUNICATION DEVICE AND WIRELESS COMMUNICATION METHOD

TECHNICAL FIELD

The present invention relates to a wireless communication device and a wireless communication method capable of wireless communication using adaptive modulation (fast adaptive modulation).

BACKGROUND ART

In recent years, a mobile station represented by a PHS (Personal Handy phone Scheme), a portable phone, and the like, becomes popular, and as a result, it becomes possible to make a phone call or to obtain information regardless of place and time. In these days, in particular, while the amount of information available keeps growing, a high speed and high quality wireless communication scheme capable of downloading of a large volume data is employed.

For example, as a next generation PHS communication standard capable of high speed digital communication, there are available ARIB (Association of Radio Industries and Businesses) STD-T95 (non-patent document 1) and PHS MoU (Memorandum of Understanding). In such communication, an OFDM (Orthogonal Frequency Division Multiplexing) system is employed. The OFDM is classified as a multiplexing scheme, or a scheme for effectively using a frequency band by partially overlapping carrier bands through use of many carriers on a unit time axis such that phases of signals to be modulated are orthogonal to each other between adjacent carriers.

Moreover, while a subchannel is allocated to each user in a time division manner according to the OFDM, there is available OFDMA (Orthogonal Frequency Division Multiplexing Access) according to which a plurality of users commonly use all subchannels and a subchannel with the best transmission efficiency for each user is allocated.

According to the ARIB STD-T95 and/or PHS MoU, a receiving device sends a modulation and coding scheme determined in adaptive modulation to a transmitting device via an anchor channel in the FM mode (fast access channel based on a map mode) (see, e.g., non-patent document 1) so that the transmitting device modulates data, using the MCS. With this arrangement, the transmitting device can communicate with the receiving device, using an MCS which is optimum in the communication environment at the time.

Further, as a technique for improving efficiency in using frequency resource in the whole wireless communication system by utilizing adaptive modulation, there is disclosed a technique for calculating the total traffic amount of the wireless communication system; determining a priority level in allocating radio resource to each terminal station, based on the calculated total traffic amount and the transmission speeds of respective terminal stations; and determining the amount of radio resource to allocate to the terminal station, based on the priority level (Patent Document 1).

Related Art Document
Non-Patent Document
Non-Patent Document 1: ARIB (Association of Radio Industries and Businesses) STD-T95
Patent Document
Patent Document 1: JP 2003-18647 A

DISCLOSURE OF THE INVENTION

Problems to be Solved by the Invention

According to the ARIB STD-T95 and PHS MoU described above, an MCS is controlled using power control, or PC, such that a transmission signal has a constant power in order to prevent interference with an adjacent base station, the PC being an indicator for use in maintaining the current transmission power. Therefore, an MCS with low modulation and coding efficiency is selected with no transmission data available, and once transmission data is generated, the transmission power is gradually increased, beginning with the MCS used with no transmission data available, to thereby increase an SINR (signal to interference and noise ratio). When it is confirmed that transmission of the transmission data, using the increased SINR, is possible, an MCS with higher modulation and coding efficiency is selected to send the data, using a higher SINR. This closed loop eventually reaches the optimum MCS and PC.

However, according to such an MCS and PC control method, there may result in a case in which communication is terminated before the optimum value is obtained when a communication right cannot be kept granted in a longer period of time or can be granted only intermittently as it takes time to reach the optimum MCS and PC. In such a case, an effect of adaptive modulation is not obtained, and therefore, the optimum communication cannot be always achieved.

The present invention has been conceived in view of the above described problem, and an object thereof to provide a wireless communication device and a wireless communication method capable of dynamically changing the optimum MCS and PC to achieve prompt and efficient data communication.

Means for Solving the Problems

In order to solve the above described problem, a representative structure of the present invention is a wireless communication device for continuing wireless communication, using a transmission power and an MCS in accordance with a requirement from a wireless communication device to communicate with, including an obtaining unit for obtaining an RSSI and an SINR of a receive signal upon generation of transmission data to be sent to the wireless communication device to communicate with; a modulation and coding scheme determining unit for determining the MCS, based on a volume of the transmission data; a transmission power determining unit for determining the transmission power, based on the volume of the transmission data, the RSSI, the SINR, and the MCS determined; and a wireless communication unit for sending the transmission data, using the MCS determined and the transmission power determined. The wireless communication device may carry out wireless communication according to ARIB STD-T95 or PHS MoU.

According to the present invention, upon generation of transmission data, the optimum MCS and transmission power for sending the transmission data are determined based on the volume of the transmission data; whether or not communication using the MCS and transmission power is possible is determined based on an RSSI (received signal strength indicator) and an SINR; and the communication is continued using the determined MCS and PC as long as it is possible. With this arrangement, it is possible to dynamically change the MCS and transmission power free from a time constant, and thus to realize prompt and efficient transmission data processing.

The modulation and coding scheme determining unit may determine the MCS, using Expression 1, that is, a modulation and coding efficiency value=the volume of the transmission data/(transmission bits per frame×an assumed transmission frame count).

With this arrangement, it is possible to determine the optimum MCS to complete transmission of transmission data, using the assumed transmission frame count of transmission frames.

Upon generation of the transmission data, the transmission power determining unit may determine the transmission power, using Expression 2, that is, the transmission power=the required SINR of the MCS determined by the modulation and coding scheme determining unit+the average interference power of an EXCH+the transmission power of an ANCH−the required SINR of the ANCH−the interference power of the ANCH.

As described above, the actual value of an ANCH (the transmission power of an ANCH, the required SINR of the ANCH, and the interference power of the ANCH) is reflected in the known value of an EXCH (the required SINR of the MCS determined by the modulation and coding scheme determining unit, and the average interference power of the EXCH) so that the optimum transmission power of the EXCH can be obtained in calculation. This makes it possible to dynamically change the MCS and/or transmission power.

When the transmission data is being exchanged to the wireless communication device to communicate with, the transmission power determining unit may determine the transmission power, using Expression 3, that is, the transmission power=the previous transmission power of an EXCH+the required SINR of the MCS determined by the modulation and coding scheme determining unit−the required SINR of an MR received from the wireless communication device to communicate with +the power compensation value indicated by a PC received from the wireless communication device to communicate with.

With this arrangement, it is possible to determine the optimum transmission power as the transmission power to require is relatively determined based on the past transmission power.

In order to solve the above described problem, another representative structure according to the present invention is a wireless communication method for use by a wireless communication device for continuing wireless communication, using a transmission power and an MCS in accordance with a requirement from a wireless communication device to communicate with, including a step of obtaining an RSSI and an SINR of a receive signal upon generation of transmission data to be sent to the wireless communication device to communicate with; a step of determining the MCS, based on the volume of the transmission data; a step of determining the transmission power, based on the volume of the transmission data, the RSSI, the SINR, and the MCS determined; and a step of sending the transmission data, using the MCS determined and the transmission power determined.

Elements corresponding to the technical concept for the above described wireless communication device and the description thereof can be similarly applied to the wireless communication method.

Effect of the Invention

In the above described wireless communication device according to the present invention, prompt and efficient data communication can be realized by dynamically changing the optimum MCS and PC.

BRIEF DESCRIPTION OF THE DRAWINGS

FIG. 4 is a diagram explaining an MCS table;

BEST MODE FOR CARRYING OUT THE INVENTION

Figure 1:
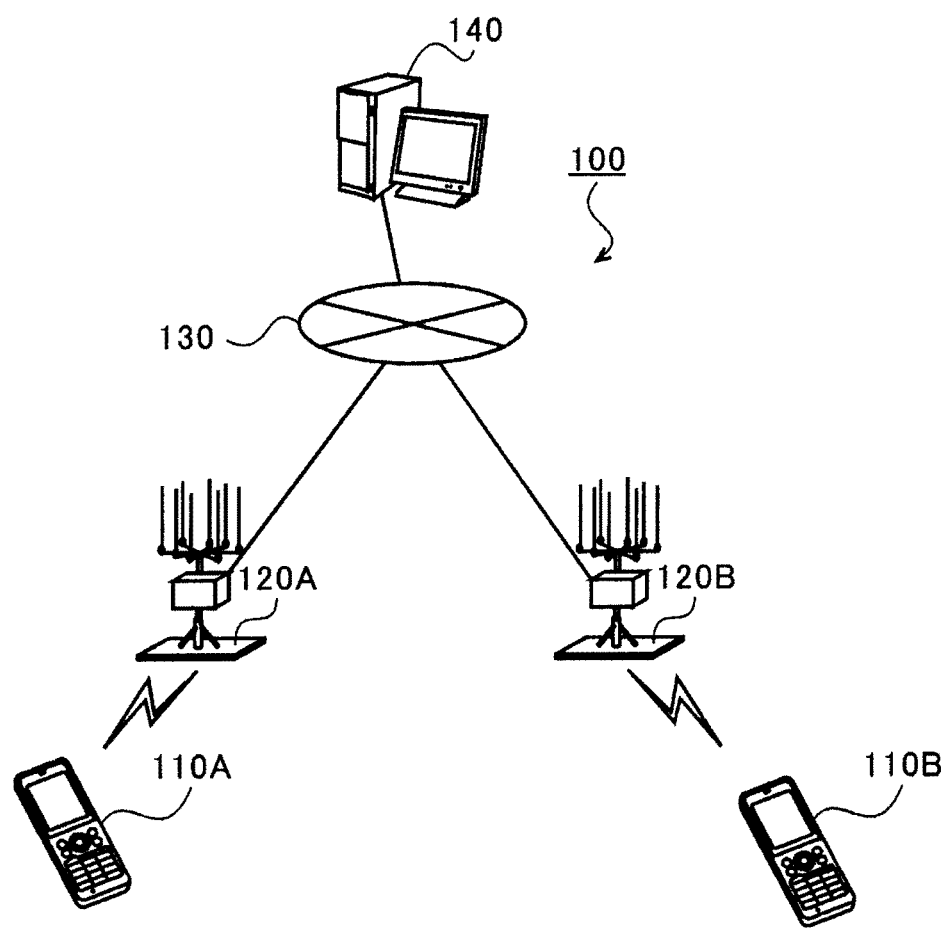
FIG. 1 is a diagram schematically explaining a connection relationship of a wireless communication system.

In the following, a preferred embodiment of the present invention will be described in detail with reference to the accompanying drawings. Note that the size, material, and any other specific values mentioned in the embodiment are mere examples to facilitate understanding of the present invention, and therefore do not limit the present invention except when it is so commented. Further, elements having a substantially identical function and/or structure are given identical reference numerals in the specification and the diagrams, and explained only once. Those not directly related to the present invention are not particularly shown.

A mobile station represented by a PHS terminal, a portable phone, and so forth constitute a wireless communication system for wireless communication with base stations fixedly located with a predetermined interval. A base station and a mobile station according to such a wireless communication system respectively function as a wireless communication device for transmitting and receiving data. In this embodiment, it is assumed in the following description to facilitate understanding of the present invention, that a base station is a wireless communication device and a mobile station is a wireless communication device with which the base station is communicating, though a reversed relationship is similarly applicable.

Initially, the entire wireless communication system is described, followed by a description of a specific structure of a base station functioning as a wireless communication device according to this embodiment. Note that although a PHS terminal is mentioned as a mobile station in this embodiment, this is not an exclusive example and a mobile station may be any electronic device capable of wireless communication, including a portable phone, a laptop personal computer, a PDA (Personal Digital Assistant), a digital camera, a music player, a car navigation system, a portable television set, a game device, a DVD player, a remote controller, and so forth.

(Wireless Communication System 100)

FIG. 1 is a diagram schematically showing a connection relationship of the wireless communication system 100. The wireless communication system 100 includes a PHS terminal 110 (indicated by reference numerals 110A and 110B in FIG. 1), a base station 120 (indicated by reference numerals 120A and 120B in FIG. 1), a communication network 130 including an ISDN (Integrated Services Digital Network) line, the Internet, a dedicated line, and so forth, and a relay server 140.

In the above described wireless communication system 100, when a user tries to connect his/her own PHS terminal 110A to another PHS terminal 110B, the PHS terminal 110A sends a wireless connection request to the base station 120A located within the communication area. Having received the wireless connection request, the base station 120A requests the relay server 140 via the communication network 130 to connect for communication with a communication partner. The relay server 140, referring to the location registration information of the PHS terminal 110B, selects, e.g., the base station 120B located within the wireless communication area of the PHS terminal 110B to ensure a communication path between the base station 120A and the base station 120B, whereby communication is established between the PHS terminal 110A and the PHS terminal 110B.

In such a wireless communication system 100, various techniques are employed to improve speed and quality of communication between the PHS terminal 110 and the base station 120. In this embodiment, a next generation PHS communication technique such as, e.g., ARIB STD-T95, PHS MoU, and so forth, is employed, and wireless communication based on the TDD (Time Division Duplex)/OFDMA (or TDD/OFDM) system is carried out between the PHS terminal 110 and the base station 120.

Figure 2:
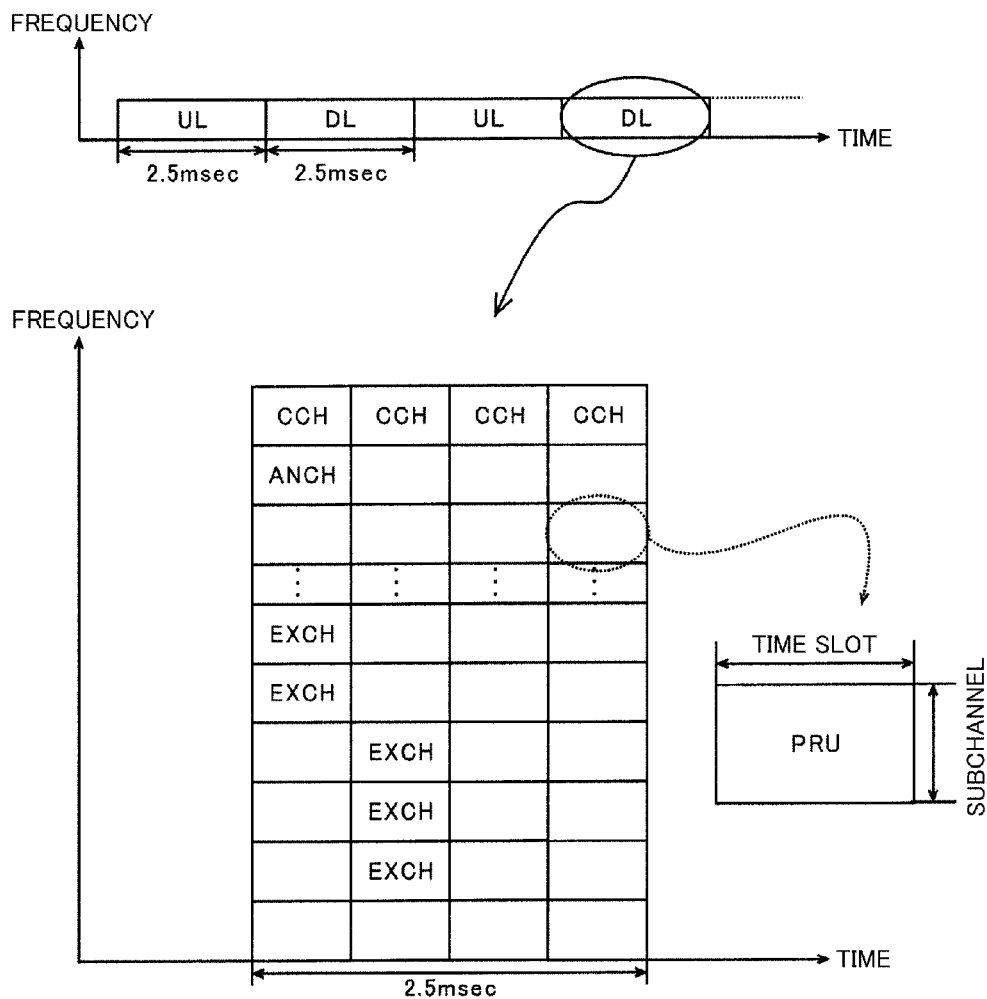
FIG. 2 is a diagram explaining a frame structure according to this embodiment.
Figure 2:
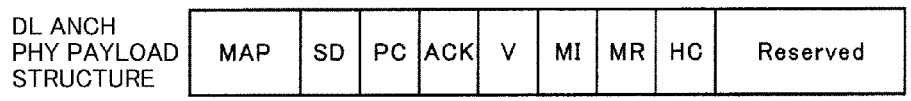

FIG. 2 is a diagram explaining a frame structure according to this embodiment. According to the OFDMA/TDMA, a two-dimensional map with a time axial direction and a frequency direction is used. In the frequency axial direction, a plurality of subchannel are arranged in a constant baseband distance (an occupied 900 kHz band), and a PRU (Physical Resource Unit) is provided for every time slot (625 μsec) of each subchannel.

A PRU is assigned to an ANCH relating to a control signal or an EXCH for storing data.

In this embodiment, an ANCH is a control signal in the FM mode, and includes, e.g., an MI (MCS indicator), an MR (MCS requirement), a transmission power control bit PC (power control), an EXCH allocation information map (MAP), a timing control bit (SD), an ACK bit for notifying success/failure of data arrival by HARQ (hybrid automatic repeat request), which is one kind of automatic repeat request, and so forth (see FIG. 2B).

In the above, the MI is an MCS indicator indicating an MCS used in modulation of data in the base station 120; the MR is an MCS requirement relating to data to be sent to its own station. To explain in view of time, an MI indicates an MCS used in modulation of data sent simultaneously with the MCS indicator; an MR indicates an MCS desired to be used in the next and thereafter transmissions. That is, the MCS required by an MR will begin to be used with respect to a frame at least one-frame subsequent to the requirement.

A PRU with least interference is assigned to an ANCH based on the result of carrier sense. One ANCH is fixedly allocated to one PHS terminal 110.

An EXCH is a PRU allocated for every PHS terminal 110 as a data transmission channel in the FM mode. Two or more EXCHs can be allocated to one PHS terminal 110.

EXCH assignment is made via carrier sense for determining whether or not a PRU is used by another user. Which PRU is assigned to an EXCH for a predetermined PHS terminal 100 is notified, using an ANCH map, for every PHS terminal 110. PRU assignment is dynamically made for every frame.

The wireless communication system 100 also utilizes adaptive modulation. With the PHS terminal 110 and the base station 120 requiring a mutually preferable MCS, it is possible to improve the communication speed, while maintaining the communication quality, by adaptively changing the modulation and coding scheme to require, depending on the varying communication environment. In the following, a specific structure and operation of the base station 120 will be described.

(Base Station 120)

Figure 3:
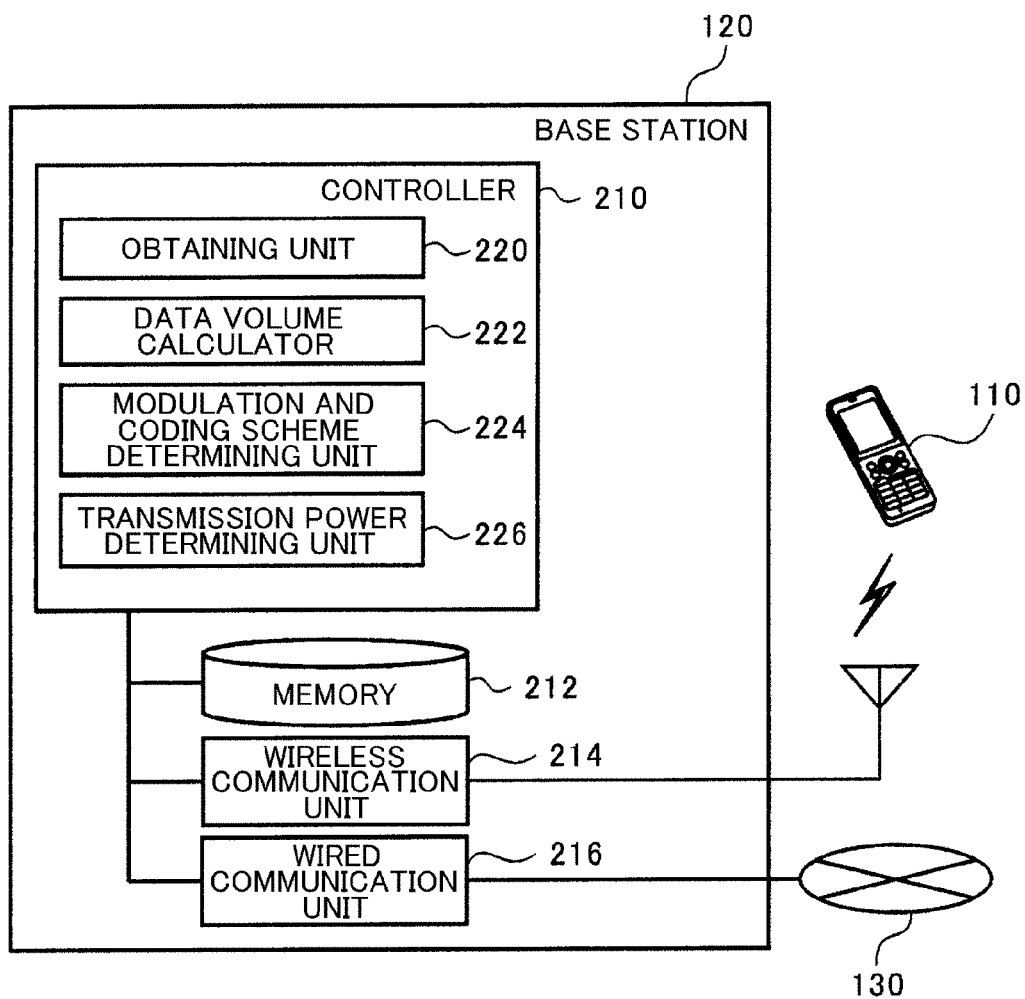
FIG. 3 is a block diagram schematically showing a structure of a base station.

FIG. 3 is a block diagram schematically showing a structure of a base station. The base station 120 includes a controller 210, a memory 212, a wireless communication unit 214, and a wired communication unit 216.

The controller 210 manages and controls the entire base station 120, using a semiconductor integrated circuit including a central processing device (CPU). The controller 210 controls communication connection of the PHS terminal 110 to the communication network 130 and/or to another PHS terminal 110, using a program stored in the memory 212.

The memory 212 includes a ROM, a RAM, an EEPROM, a non-volatile RAM, a flash memory, a HDD, or so forth, and stores a program, and so forth, to be processed by the controller 210. In this embodiment, an MCS table correlating modulation and coding efficiency with an MCS class, and transmission power for sending data are stored in the memory 212.

FIG. 4 is a diagram explaining the MCS table. In this embodiment, for example, ten MCS classes except the reserved class of the MCS indicator "4" are provided, in which a modulation scheme and a coding scheme are prepared for each class. In FIG. 4, an MCS indicator having a larger number relates to higher modulation and coding efficiency.

The wireless communication unit 214 establishes communication with the PHS terminal 110, and carries out data transmission and reception. In this embodiment, the wireless communication unit 214 sends transmission data to the PHS terminal 110, using the MCS determined by the modulation and coding scheme determining unit 224 to be described later and the transmission power determined by the transmission power determining unit 226 to be described later.

The wired communication unit 216 can be connected to various servers, including the relay server 140, via the communication network 130.

In this embodiment, the controller 210 functions also as an obtaining unit 220, a data volume calculator 222, a modulation and coding scheme determining unit 224, and a transmission power determining unit 226.

Upon generation of data to be sent to the PHS terminal 110 to communicate with, the obtaining unit 220 obtains the RSSI and SINR of a receive signal via the wireless communication unit 214.

Upon generation of transmission data, the data volume calculator 222 calculates the transmission data volume.

The modulation and coding scheme determining unit 224 determines an MCS to require, based on the modulation and coding efficiency value calculated by substituting the transmission data volume calculated by the data volume calculator 222 into Expression 1 mentioned below.

Modulation and coding efficiency value=transmission data volume/(transmission bits per frame×assumed transmission frame count)  (Expression 1)

wherein the assumed transmission frame count indicates the number of frames necessary to send all transmission data, being a fixed value which can be arbitrarily set. In this embodiment, the assumed transmission frame count is ten. The transmission bits per frame is a value obtained by multiplying the number of EXCHs allocated to one frame by the number of symbols usable for one EXCH (408 symbols in this embodiment).

In this embodiment, the modulation and coding scheme determining unit 224 determines as an MCS to require an MCS having the minimum conversion efficiency larger than the modulation and coding efficiency value calculated using Expression 1.

For example, in the case where the transmission data volume calculated by the data volume calculator 222 is 3000 bits and one EXCH is allocated to one frame, substitution of these in Expression 1 results in "a modulation and coding efficiency value=3000/(1×408×10)=approximately 0.7". Therefore, while referring to the MCS table stored in the memory 212, the modulation and coding scheme determining unit 224 determines as an MCS to require the QPSK scheme indicated by the MCS indicator 2 with the minimum modulation and coding efficiency exceeding 0.7, i.e., 1 here.

In the case where the modulation and coding efficiency value calculated using Expression 1 is larger than the maximum modulation and coding efficiency of any MCS available, the modulation and coding scheme determining unit 224 determines as an MCS to require an MCS having the maximum modulation and coding efficiency.

For example, in the case where the volume of transmission data calculated by the data volume calculator 222 is 40000 bits and one EXCH is allocated to one frame, substitution of these into Expression 1 results in "a modulation and coding efficiency value=40000/(1×408×10)=approximately 9.8". Therefore, the modulation and coding scheme determining unit 224 determines as an MCS to require the 256QAM scheme indicated by the MCS indicator 10 having the maximum modulation and coding efficiency 7.

In this manner, it is possible to determine the optimum MCS to complete transmission of transmission data, using the assumed transmission frame count of transmission frames.

Upon generation of transmission data, the transmission power determining unit 226 substitutes the RSSI and SINR of a receive signal, obtained by the obtaining unit 220, the transmission data volume calculated by the data volume calculator 222, and the MCS determined by the modulation and coding scheme determining unit 224 into Expression 2 to be mentioned below to thereby determine the transmission power of a PRU, i.e., an EXCH, to transmit the data.

EXCH transmission power=required SINR of MCS
    determined by modulation and coding scheme
    determining unit+average interference power of
    EXCH+(transmission power of ANCH−required
    SINR of ANCH−interference power of ANCH)    (Expression 2)

Figure 5:
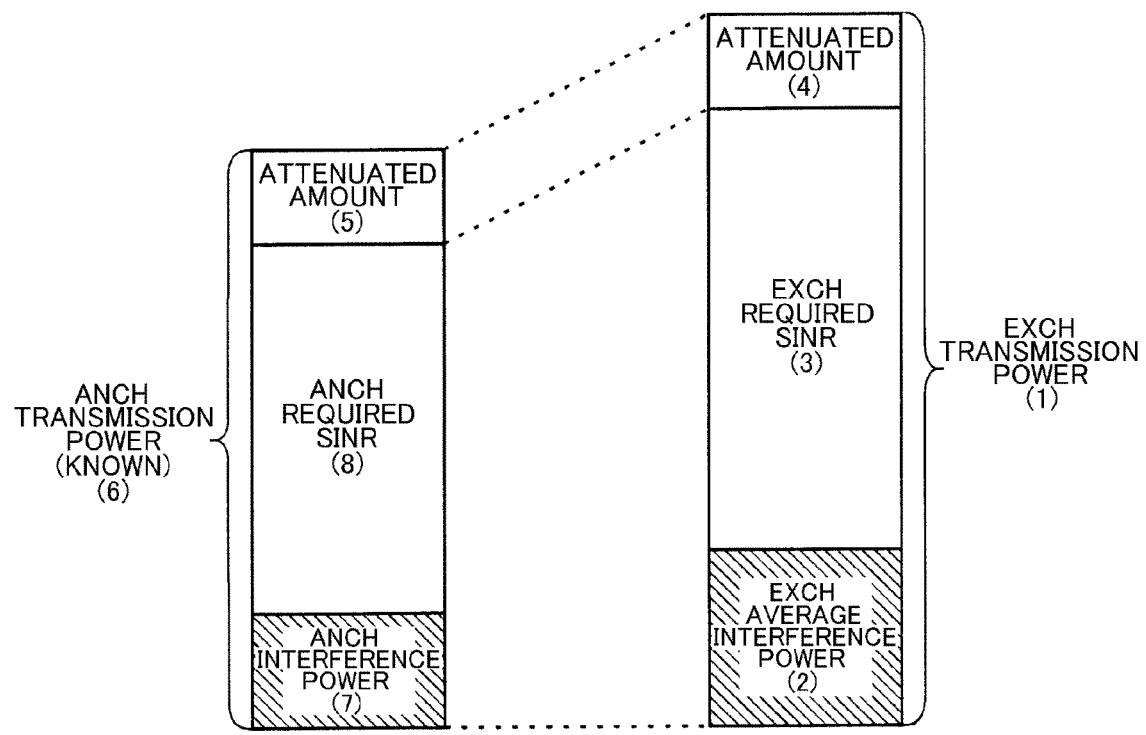
FIG. 5 is a diagram explaining Expression 2.

FIG. 5 is a diagram explaining Expression 2. As shown in FIG. 5, the transmission power of an EXCH (1) wished to be calculated corresponds to the sum of the average interference power of the EXCH (2), the required SINR of the EXCH (3), and an attenuated amount until a signal sent with the transmission power is received (4).

Note that the average interference power of the EXCH (2) is the average interference power of all PRUs (assigned PRU) assigned to an EXCH. The interference power of each EXCH in the case where an assigned PRU is used in communication or the like with another PHS terminal 110 is the difference between the RSSI and the SINR at the time. Meanwhile, in the case where an assigned PRU is not used, as the SINR is zero, the RSSI at a control symbol position is used intact as the average interference power of an EXCH.

The above described required SINR of the EXCH (3) is the required SINR of the MCS determined by the modulation and coding scheme determining unit 224, using Expression 1.

The above described attenuated amount (4) is regarded substantially equal to the attenuated amount (5) contained in the transmission power of an ANCH. Therefore, the attenuated amount (4) is equal to the amount obtained by subtracting the interference power of an ANCH (7) and the required SINR of the ANCH (8) from the transmission power of the ANCH (6). The interference power of the ANCH (7) is equal to the value obtained by subtracting the SINR from the RSSI of an ANCH sent from the PHS terminal 110 and received by the wireless communication unit 214. The required SINR of the ANCH (8) is the required SINR of the MCS determined according to the standard such as ARIB STD-T95, PHS MoU, or the like.

With an arrangement in which the transmission power of an EXCH is calculated using Expression 2 described above, the actual value of an ANCH (the transmission power (6), the required SINR of the ANCH (8), and the interference power of the ANCH (7)) is reflected in the known value of an EXCH (the required SINR of the MCS (3) determined by the modulation and coding scheme determining unit 224 and the average interference power of the EXCH (2)) so that the optimum transmission power of the EXCH can be obtained in calculation. This makes it possible to dynamically change the MCS and/or transmission power.

Further, when transmission data is being exchanged with the PHS terminal 110, the transmission power determining unit 226 calculates the transmission power, using Expression 3 described below.

Transmission power=previous transmission power of
    EXCH+(required SINR of MCS determined by
    modulation and coding scheme determining
    unit−required SINR of MR received from wire-
    less communication device to communicate
    with)+power compensation value indicated by
    PC received from wireless communication device
    to communicate with    (Expression 3)

wherein the previous transmission power of an EXCH is a value stored in the memory 212. A value obtained by subtracting the required SINR of an MR (MCS) received from a wireless communication device to communicate with, that is, the PHS terminal 110, from the required SINR of the MCS determined by the modulation and coding scheme determining unit 224 corresponds to the difference between the SINR of a signal to send and the SINR of a signal previously sent, that is, the amount of the SINR wished to be increased in the next transmission. Further, compensation of the power compensation value indicated by the PC received from the wireless communication device to communicate with (PHS terminal 110) makes it possible to estimate transmission power in detail.

With an arrangement in which the transmission power value of an EXCH is calculated using Expression 3 when transmission data is being exchanged with the PHS terminal 110, the optimum transmission power can be determined as the transmission power is relatively determined based on the past transmission power.

According to the above described wireless communication system 100, communication environment between wireless communication devices is estimated based on the RSSI and SINR of a communication signal, and an MCS to require and transmission power are determined based on the transmission data volume. This makes it possible to dynamically change the MCS and transmission power, which conventionally have been gradually changed to the optimum value while observing the situation, and thus to achieve prompt and efficient data communication. In the following, a wireless communication method using the above described base station 120 will be described.

(Wireless Communication Method)

Figure 6:
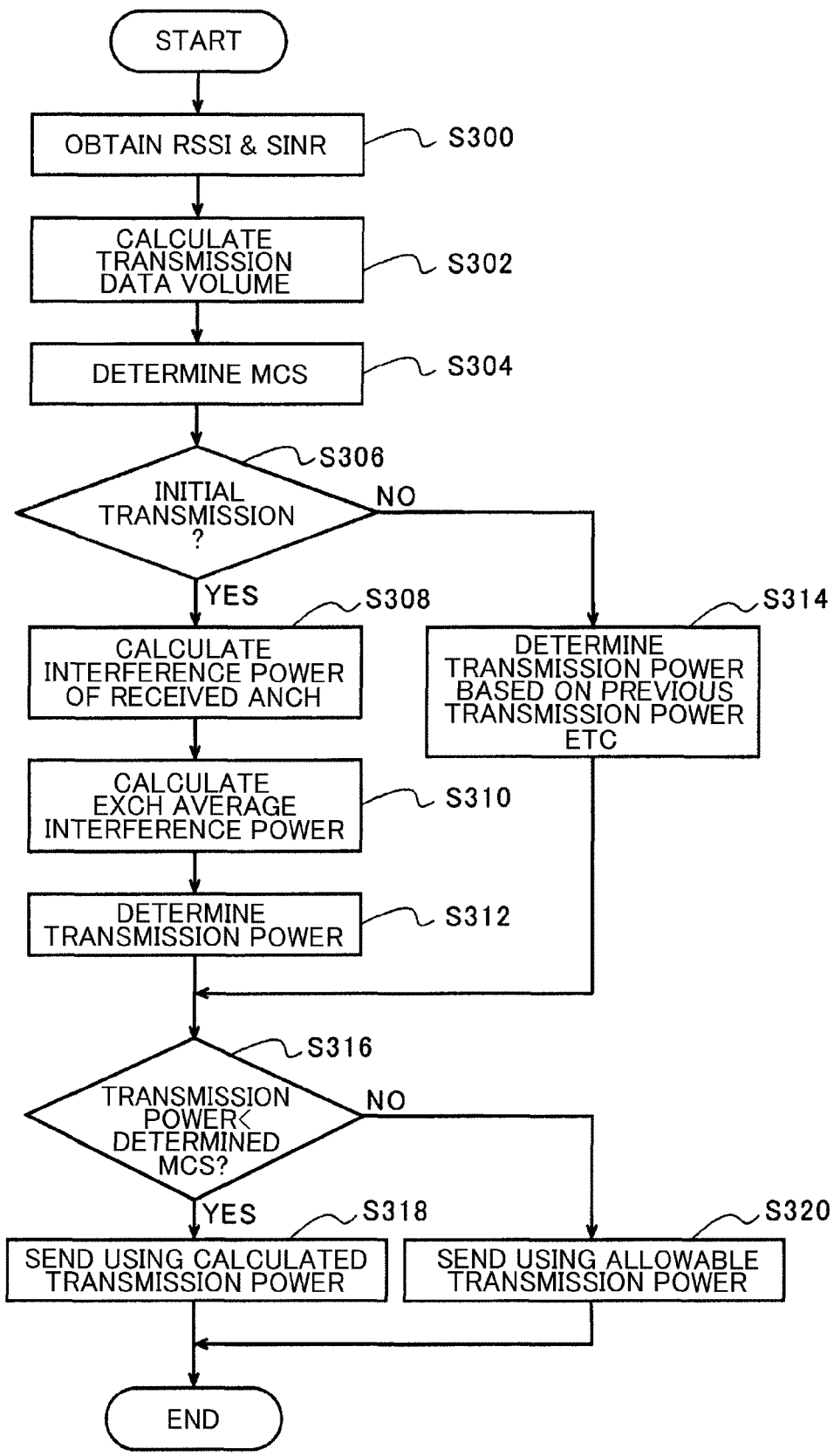
FIG. 6 is a flowchart of a process of a wireless communication method.

FIG. 6 is a flowchart of a process relating to a wireless communication method.

Upon generation of transmission data to be sent from the base station 120 to the PHS terminal 110, the obtaining unit 220 of the base station 120 obtains the RSSI and SINR of a receive signal (S300: obtaining step), and the data volume calculator 222 calculates the transmission data volume (S302: volume calculation step). Then, the modulation and coding scheme determining unit 224 substitutes the data volume obtained at the volume calculation step S302 into Expression 1 described above to calculate a modulation and coding efficiency value, and then determines an MCS to require (S304: MCS determination step).

Thereafter, whether or not the transmission of concern is the initial transmission, that is, whether or not it is the beginning of data transmission, is determined (S306: start determination step). When it is the initial transmission (initial time), the interference power of an ANCH ((7) in FIG. 5) received from the PHS terminal 110 is calculated based on the RSSI and SINR obtained at the obtaining step S300 by the transmission power determining unit 226 (S308: ANCH interference calculation step), and the average interference power of an EXCH ((2) in FIG. 5) is calculated (S310: EXCH interference calculation step). Then, the required SINR of the MCS ((3) in FIG. 5) determined at the MCS determination step S304, the average interference power of the EXCH, calculated at the EXCH interference calculation step S310, the transmission power of the ANCH sent to the PHS terminal 110 by the wireless communication unit 214, the required SINR of the ANCH received from the PHS terminal 110 by the wireless communication unit 214, and the interference power of the ANCH calculated at the ANCH interference calculation step S308 are substituted into Expression 2 described above to determine the transmission power of the EXCH (S312: initial transmission power determination step).

Meanwhile, when it is determined at the start determination step S306 that it is not the initial transmission, that is, data transmission is ongoing (No at S306), the transmission power determining unit 226 substitutes into Expression 3 described above, the previous transmission power of an EXCH, stored in the memory 212, the required SINR of the MCS determined at the MCS determination step S304, the required SINR of the MCS indicated by the MR received from the PHS terminal 110 by the wireless communication unit 214, and the PC received from the PHS terminal 110 by the wireless communication unit 214, to determine the transmission power (S314: ongoing transmission power determination step).

Whether or not the transmission power determined at either the initial transmission power determination step S312 or the ongoing transmission power determination step S314 is equal to or smaller than the allowable transmission power of the MCS determined at the MCS determination step S304 (S316: transmission power determination step), is determined. When it is determined equal to or lower than the allowable transmission power, data transmission is performed with the calculated transmission power (S318: calculated power transmission step). Meanwhile, when it is determined at the transmission power determination step S316 that the transmission power is equal to or larger than the allowable transmission power, data transmission is performed with the allowable transmission power of the MCS determined at the MCS determination step S304 (S320: allowable power transmission step).

According to the above described wireless communication method in this embodiment, upon generation of transmission data, the optimum MCS and transmission power to send the transmission data are determined, based on the volume of the transmission data; whether or not it is possible to perform communication using the determined MCS and transmission power is determined, based on the RSSI and SINR; the communication is continued using the determined MCS and PC as long as it is possible. With this arrangement, it is possible to dynamically change the MCS and transmission power at once free from a time constant, and thus to promptly and efficiently process the transmission data.

Note that while a preferred embodiment of the present invention is described in the above, referring to the accompanying drawings, obviously, the present invention is not limited to this embodiment. That is, obviously, a person skilled in the art can conceive various examples of changes and modifications within the scope defined by the claims, and such examples are to be understood as being included in the technical scope of the present invention.

Note that the respective steps of the wireless communication method described in this specification are not necessarily carried out in a time serial manner in the order shown in the flowchart, but parallel processing and/or sub-routine processing may be included.

Industrial Applicability

The present invention is applicable to a wireless communication device and a wireless communication method capable of wireless communication utilizing adaptive modulation (fast adaptive modulation).

The invention claimed is:

1. A wireless communication device for continuing wireless communication, using a transmission power and a modulation coding scheme (MCS) in accordance with a requirement from another wireless communication device in communication with the wireless communication device, the wireless communication device comprising:
   an obtaining unit for obtaining a received signal strength indicator (RSSI) and a signal to interference noise ratio (SINR) of a receive signal upon generation of transmission data to be sent to the another wireless communication device;
   a modulation and coding scheme determining unit for determining the MCS, based on a volume of the transmission data;
   a transmission power determining unit for determining the transmission power, based on the volume of the transmission data, the RSSI, the SINR, and the MCS determined; and
   a wireless communication unit for sending the transmission data, using the MCS determined and the transmission power determined,
   wherein upon generation of the transmission data, the transmission power determining unit determines the transmission power using the transmission power=a required SINR of the MCS determined by the modulation and coding scheme determining unit+an average interference power of an EXCH+a transmission power of an ANCH−a required SINR of the ANCH−an interference power of the ANCH.

2. The wireless communication device according to claim 1, wherein the modulation and coding scheme determining unit determines the MCS using a modulation and coding efficiency value=the volume of the transmission data/(transmission bits per frame×an assumed transmission frame count).

3. The wireless communication device according to claim 1, wherein the wireless communication device carries out wireless communication according to ARIB STD-T95 or PHS MoU.

4. A wireless communication device for continuing wireless communication, using a transmission power and a modulation coding scheme (MCS) in accordance with a requirement from another wireless communication device in communication with the wireless communication device, the wireless communication device comprising:

an obtaining unit for obtaining a received signal strength indicator (RSSI) and a signal to interference noise ratio (SINR) of a receive signal upon generation of transmission data to be sent to the another wireless communication device;

a modulation and coding scheme determining unit for determining the MCS, based on a volume of the transmission data;

a transmission power determining unit for determining the transmission power, based on the volume of the transmission data, the RSSI, the SINR, and the MCS determined; and a wireless communication unit for sending the transmission data, using the MCS determined and the transmission power determined, wherein when the transmission data is being exchanged to the another wireless communication device, the transmission power determining unit determines the transmission power using the transmission power=a previous transmission power of an EXCH+a required SINR of the MCS determined by the modulation and coding scheme determining unit−a required SINR of an MR received from the wireless communication device to communicate with+a power compensation value indicated by a PC received from the another wireless communication device.

5. The wireless communication device according to claim 4, wherein the modulation and coding scheme determining unit determines the MCS using a modulation and coding efficiency value=the volume of the transmission data/(transmission bits per frame×an assumed transmission frame count).

6. The wireless communication device according to claim 4, wherein the wireless communication device carries out wireless communication according to ARIB STD-T95 or PHS MoU.

7. A wireless communication method for use by a wireless communication device for continuing wireless communication, using a transmission power and a modulation coding scheme (MCS) in accordance with a requirement from another wireless communication device in communication with the wireless communication device, the method comprising:

a step of obtaining a received signal strength indicator (RSSI) and a signal to interference noise ratio (SINR) of a receive signal upon generation of transmission data to be sent to the wireless communication device to communicate with;

a step of determining the MCS, based on a volume of the transmission data;

a step of determining the transmission power, based on the volume of the transmission data, the RSSI, the SINR, and the MCS determined; and a step of sending the transmission data, using the MCS determined and the transmission power determined, wherein upon generation of the transmission data, the transmission power determining unit determines the transmission power using the transmission power=a required SINR of the MCS determined by the modulation and coding scheme determining unit+an average interference power of an EXCH+a transmission power of an ANCH−a required SINR of the ANCH−an interference power of the ANCH.

* * * * *